(12) United States Patent
Holmquist et al.

(10) Patent No.: US 6,580,590 B2
(45) Date of Patent: Jun. 17, 2003

(54) MOTOR DRIVER FAULT PROTECTOR

(75) Inventors: Thomas W Holmquist, Fort Collins, CO (US); Ron L. King, Loveland, CO (US); Joseph A Eccher, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 359 days.

(21) Appl. No.: 09/755,555

(22) Filed: Jan. 4, 2001

(65) Prior Publication Data

US 2002/0085324 A1 Jul. 4, 2002

(51) Int. Cl.$^7$ ................................................. H02H 5/04
(52) U.S. Cl. ........................................ 361/31; 361/93.7
(58) Field of Search ........................... 361/93.7, 18, 23, 361/31, 87; 307/412

(56) References Cited

U.S. PATENT DOCUMENTS 4,757,246 A * 7/1988 Komuro ..................... 318/696
6,441,679 B1 * 8/2002 Ohshima ..................... 327/538

* cited by examiner

Primary Examiner—Ronald W. Leja

(57) ABSTRACT

A motor driver high current protector includes a voltage source, a current sensor, a comparator, a switch, a delay circuit, and an inhibitor. The current sensor is configured to sense current passing through the motor driver and output a voltage responsive to the sensed current. The comparator has an output and is configured to generate a low voltage at its output while the output of the current sensor exceeds a first reference voltage. The switch has an input, an output, and a base. The base is activated by a low voltage at the output of the comparator to close the switch. Closing the switch provides electrical connection between the input and the output of the switch. The input of the switch is connected to the voltage source. The delay circuit is connected to the output of the switch and is configured to delay the voltage at the output of the switch while the switch is open. The delay circuit may include a resistor and a capacitor each connected to the output of the switch. The inhibitor is configured to inhibit the motor driver while the output of the switch exceeds a second reference voltage. The inhibitor may include first and second inhibitor comparators, each of the inhibitor comparators has an output. Each of the first and second inhibitor comparators is configured to generate a low voltage at its output while the output of the switch exceeds a second reference voltage.

14 Claims, 4 Drawing Sheets

# MOTOR DRIVER FAULT PROTECTOR

FIELD OF THE INVENTION

This invention relates in general to fault protection and, more particularly, to over-current protection of a motor driver.

BACKGROUND OF THE INVENTION

Servomotors have many uses. They are useful for precisely controlling movement in a variety of circumstances. Servomotors are usually controlled by a driver circuit. The driver circuit provides current to the servomotor, which causes the motor to turn.

When a servomotor fails, it often presents a very low impedance to the driver circuit for the motor. Low impedance causes excessive current to flow through the driver circuit. Usually this excessive current causes a failure in the driver circuit.

Conventionally, high current protection is accomplished by fuses. Unfortunately, the when a servomotor fails, the current spikes so quickly in the driver circuit that fuses cannot react fast enough to protect the driver circuit.

SUMMARY OF THE INVENTION

According to principles of the present invention, a motor driver high current protector includes a voltage source, a current sensor, a comparator, a switch, a delay circuit, and an inhibitor. The current sensor is configured to sense current passing through the motor driver and output a voltage responsive to the sensed current. The comparator has an output and is configured to generate a low voltage at its output while the output of the current sensor exceeds a first reference voltage. The switch has an input, an output, and a base. The switch is activated by a low voltage at the output of the comparator and the base of the switch to close the switch. Closing the switch provides electrical communication between the input and the output of the switch. The input of the switch is connected to the voltage source. The delay circuit is connected to the output of the switch and is configured to decay the voltage at the output of the switch while the switch is open. The inhibitor is configured to inhibit the motor driver while the output of the switch exceeds a second reference voltage.

According to further principles of the present invention, the current sensor may be a resistor connected to the motor driver to sense the current passing through the motor driver and produce a voltage drop as the output of the current sensor.

According to further principles of the present invention, the switch may include first and second resistors for biasing the voltage at the base of the transistor. The first resistor is provided between the output of the comparator and the base of the transistor. The second resistor is provided between the voltage source and the base of the transistor.

According to further principles of the present invention, the inhibitor may include first and second inhibitor comparators, each of the inhibitor comparators has an output. Each of the first and second inhibitor comparators is configured to generate a low voltage at its output while the output of the switch exceeds a second reference voltage.

DETAILED DESCRIPTION OF THE INVENTION

Figure 1:
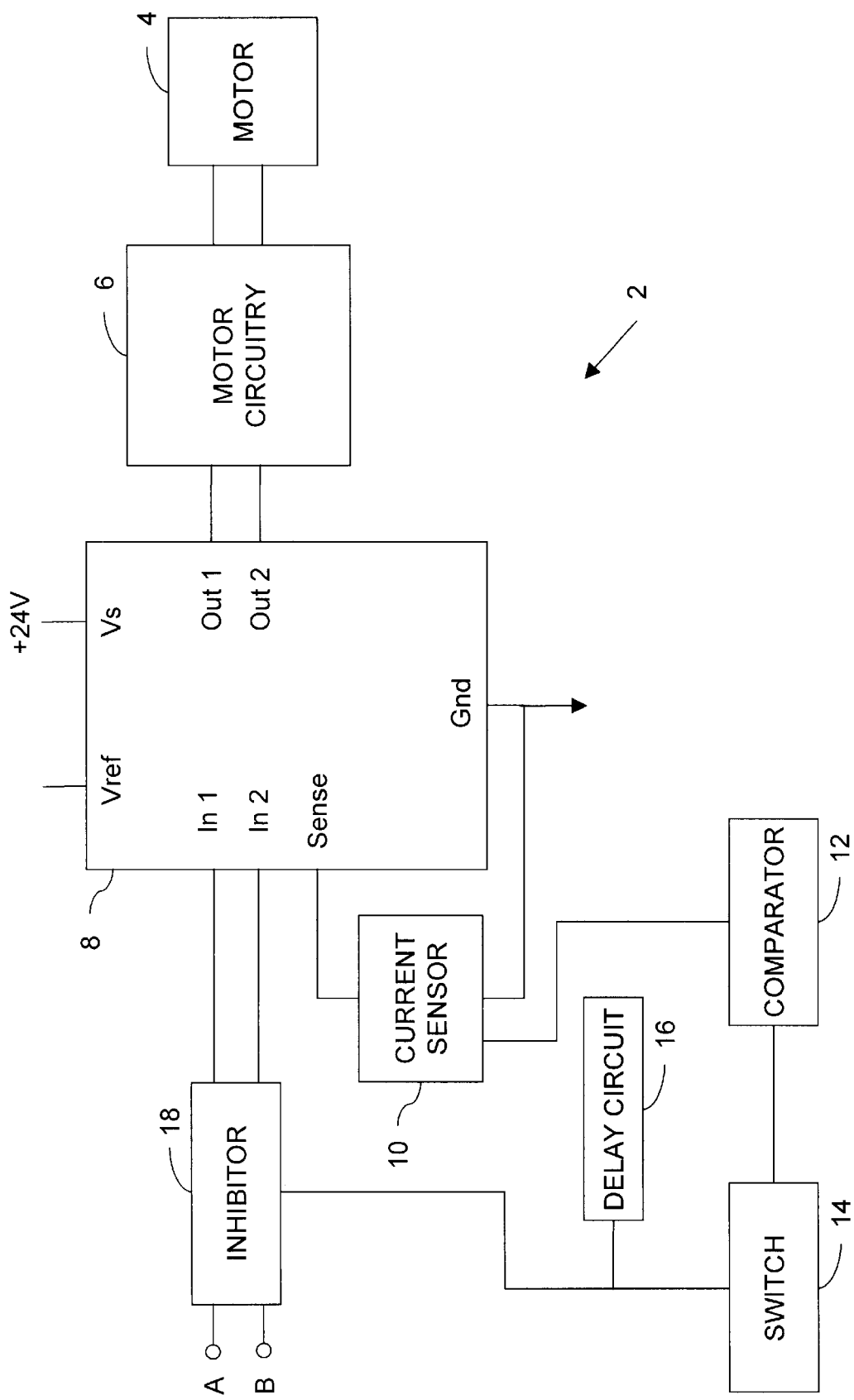
FIG. 1 is a block diagram illustrating a motor driver circuit including a motor driver high current protector of the present invention.

Illustrated in FIG. 1 is a motor driver circuit 2. Motor driver circuit 2 includes motor 4, motor circuitry 6, motor driver 8, current sensor 10, comparator 12, switch 14, delay circuit 16, and inhibitor 18.

Motor 4 is any servomotor useable with motor driver 8. Motor circuitry 6 is any circuitry necessary or desirable between motor driver 8 and motor 6 for operation of motor 6.

Motor driver 8 is any driver for motor 4. In one embodiment, motor driver 8 includes an integrated circuit motor driver such as a DMOS full bridge driver.

Figure 2:
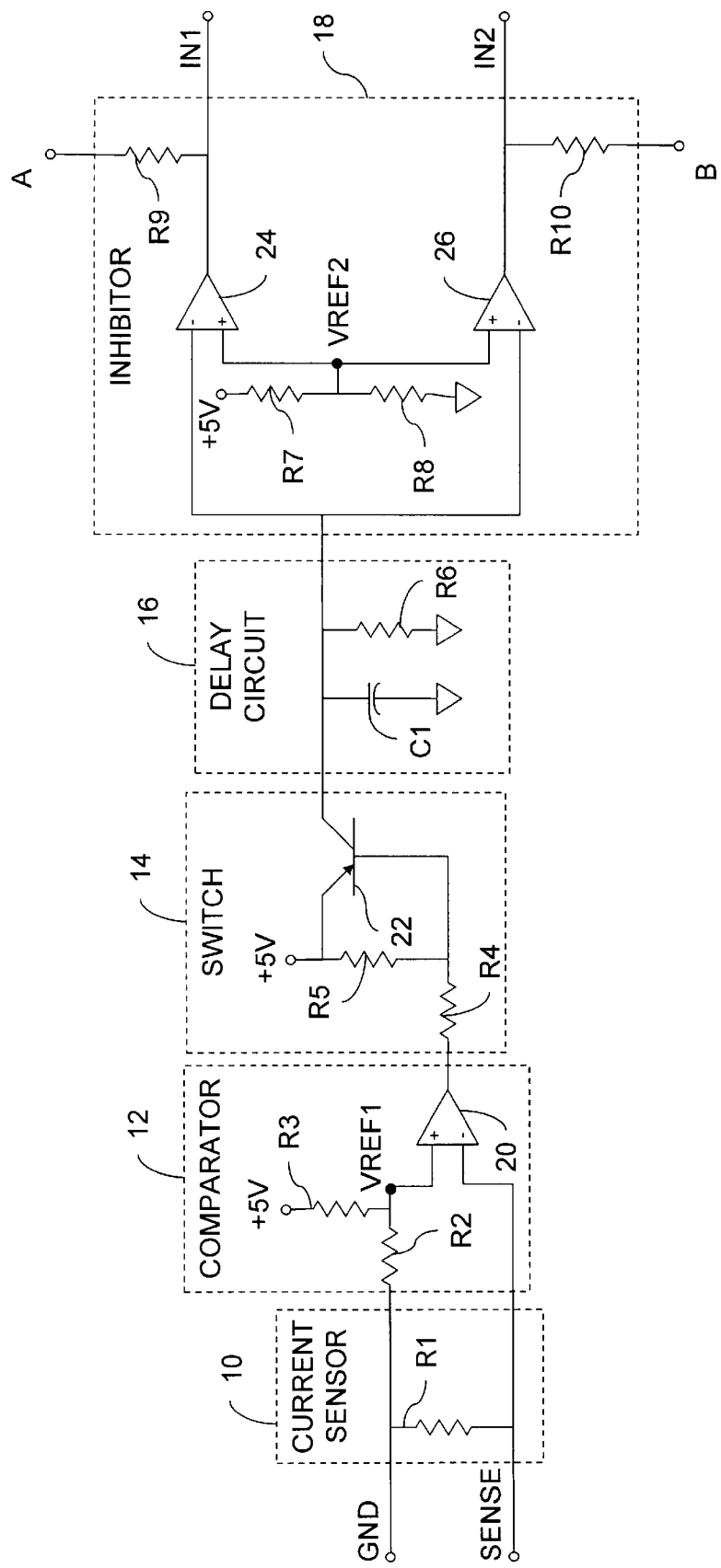
FIG. 2 is a schematic diagram of one embodiment of a motor driver high current protector of the present invention.

FIG. 2 illustrates current sensor 10, comparator 12, switch 14, delay circuit 16, and inhibitor 18 in more detail. Current sensor 10 is any object or device for translating a current into a voltage drop. In one embodiment, current sensor 10 includes resistor R1. The resistance value of resistor R1 is any value suited to the needs of motor driver 8 and comparator 12. In one embodiment, resistor R1 is a 0.05 ohm resistor.

Comparator 12 is any circuit or device for comparing the voltage produced by current sensor 10 to a first reference voltage $V_{ref1}$ and generating an output depending on which of the voltages is greater. The output is low, near 0 volts, while the voltage produced by current sensor 10 exceed first reference voltage $V_{ref1}$. While first reference voltage $V_{ref1}$ exceeds the voltage produced by current sensor 10, the output of comparator 12 is open.

First reference voltage $V_{ref1}$ is of any value suitable for the purpose of the present invention. First reference voltage $V_{ref1}$ is generated in any suitable manner. For example, first reference voltage $V_{ref1}$ may be generated using a voltage divider to create a voltage of about 33.8 mV at first reference voltage $V_{ref1}$. In one embodiment, the voltage divider includes resistors R2 and R3. Resistor R2 is 46.4 ohms and resistor R3 is 6.81 k ohms.

First reference voltage $V_{ref1}$ and R1 and are selected so that the voltage output by current sensor 10 exceeds First reference voltage $V_{ref1}$ when motor 4 faults and provides a very low impedance to motor driver 8.

Switch 14 is any circuit or device for allowing electrical communication between an input and an output, responsive to the output of comparator 12. In one embodiment, switch 14 includes transistor 22 and divider resistors R4, R5. While the output of comparator is low, resistors R4, R5 conduct a base current in transistor 22, closing transistor 22 to provide an electrical connection between a voltage source and the output of the transistor 22. While the output of comparator 22 is open, resistor R5 brings the base voltage to the same as the emitter voltage of transistor 22, opening the switch. The voltage source is 5 volts in one embodiment.

Delay circuit 16 is any circuit or device for causing a slow decay of charge from the output of transistor 22 when switch 14 is open. In one embodiment, delay circuit 16 includes capacitor C1 and resistor R6. Capacitor C1 is a 1000 pF capacitor and resistor R6 is a 100 k ohm resistor. Delay circuit 16 is configured so that the charging time is very fast, via transistor 22.

Inhibitor 18 is any device or circuit for inhibiting motor drive 8 while the output of switch 14 exceeds a second reference voltage $V_{ref2}$. In one embodiment, inhibitor 18 includes second and third comparators 24, 26. The output of switch 14 is connected to the inverting inputs of comparators 24, 26. The non-inverting inputs of second and third comparators 24, 26 are connected to second reference voltage $V_{ref2}$.

Second reference voltage $V_{ref2}$ is generated from resistors R7 and R8 in series. Resistors R7 and R8 are have resistance values as necessary to achieve the desired voltage level at second reference voltage $V_{ref2}$. For example, if the desired voltage level at second reference voltage $V_{ref2}$ is 2.5 volts, resistors R7 and R8 are equal and may be selected to be 1 k ohm each.

The outputs of second and third comparators are connected to Input 1 and Input 2, respectively, of motor controller 8. When the output of switch 14 exceeds second reference voltage $V_{ref2}$, the outputs of second and third comparators 24, 26 are set to near 0 volts inhibiting inputs A and B. While second reference voltage $V_{ref2}$ exceeds the output of switch 14, the outputs of second and third comparators 24, 26 are open, allowing the voltage at Input 1 and Input 2 of motor controller 8 to be controlled by A and B, respectively.

Figure 3A:
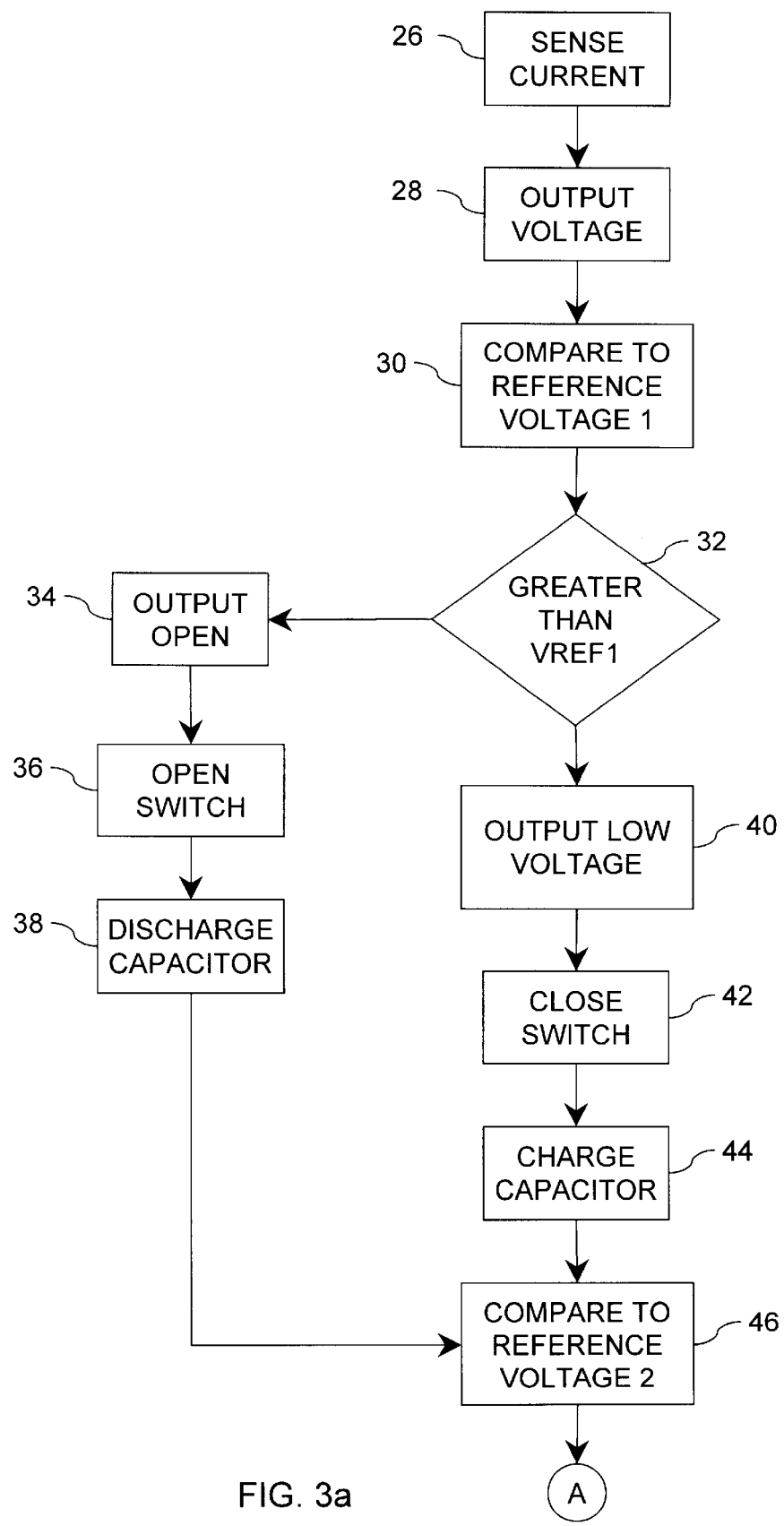
FIGS. 3a and 3b are a flow chart illustrating one embodiment of a method of the present invention for protecting a motor driver circuit from high current.
Figure 3B:
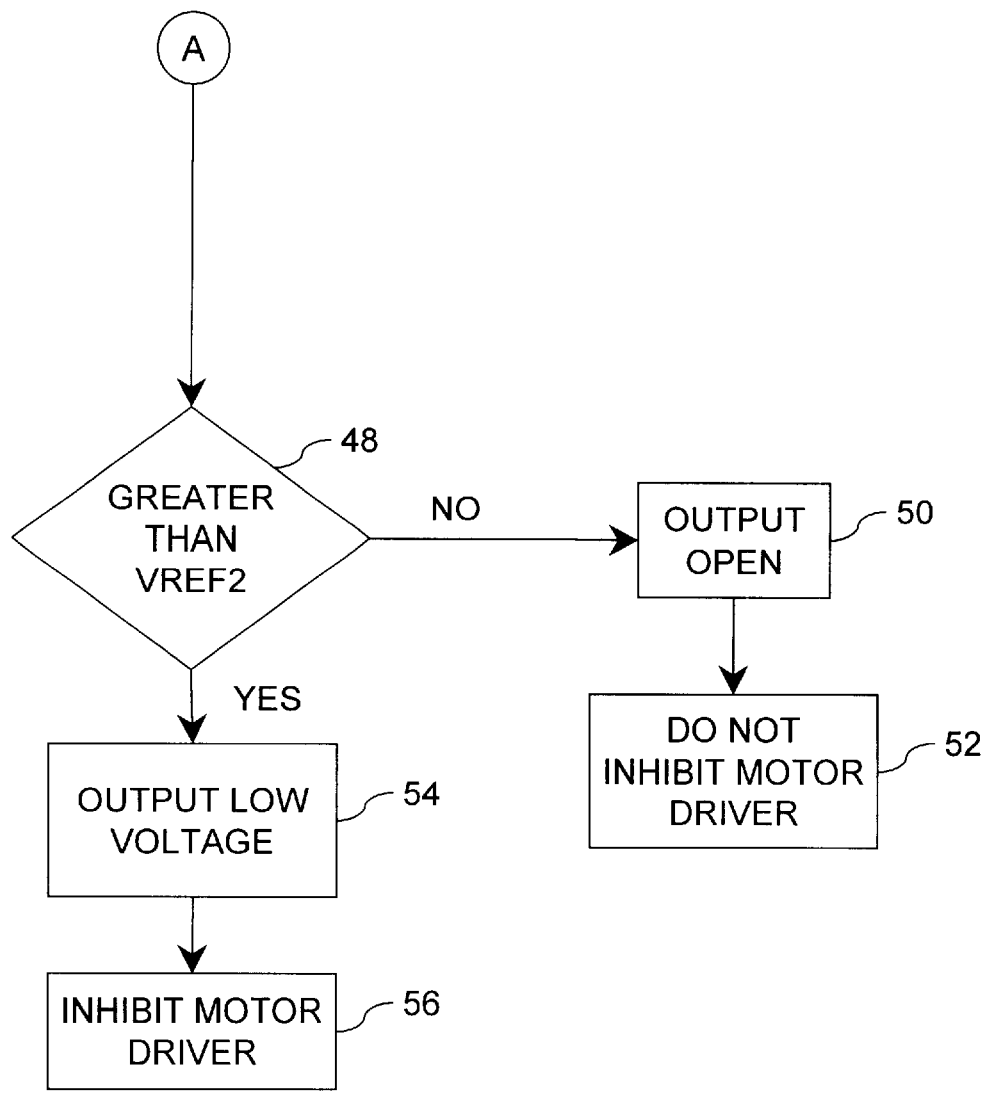

FIGS. 3*a* and 3*b* are a flow chart representing steps of one embodiment of the present invention. Although the steps represented in FIGS. 3*a* and 3*b* are presented in a specific order, the present invention encompasses variations in the order of steps. Furthermore, additional steps may be executed between the steps illustrated in FIG. 3*a* and 3*b* without departing from the scope of the present invention.

Current is sensed 26 in motor controller 8. A voltage is output 28 from current sensor 10 in response to the sensed current. The output voltage of current sensor 10 is compared to first reference voltage $V_{ref1}$. If the output voltage of current sensor 10 is greater than 32 first reference voltage $V_{ref1}$, the output of comparator 12 is open 34. Switch 14 is opened 36 and capacitor C1 discharges 38 the voltage at the output of switch 22 until it is completely discharged or switch 22 is closed 42.

If the output voltage of current sensor 10 is not greater than 32 first reference voltage $V_{ref1}$, the output of comparator 12 is 40 near 0 volts. Switch 14 is closed 42 and capacitor C1 charges 44 the voltage at the output of switch 22 until it equals the voltage source or switch 22 is opened 36.

The voltage at the output of switch 22 is compared to second reference voltage $V_{ref2}$. If the output voltage of switch 14 is not greater than 48 second reference voltage $V_{ref2}$, the outputs of second and third comparators 24, 26 are open 50. Motor driver 8 is not inhibited 52 and controlled as normal by a pulse width modulated signals at A and B.

If the output voltage of switch 14 is greater than 48 than second reference voltage $V_{ref2}$, the outputs of second and third comparators 24, 26 is 54 near 0 volts. Motor driver 8 is inhibited 56, reducing the current flowing through moor driver 8.

Inhibiting motor driver 8 reduces the current sensed by current sensor 10 eventually resulting in motor driver 8 being not inhibited. If the fault is still present in motor 4, the current will again increase resulting in a cyclical increase and decrease of current through motor driver 6. The cyclical current could be damaging to motor driver 8. In order to prevent damaging cyclical current, the capacitance of capacitor C1 and resistance of resistor R6 are selected to produce a time constant sufficient to keep motor driver 8 inhibited long enough so that motor driver 8 is not damaged. The time constant is the capacitance in Farads times the resistance in ohms. For example, if capacitor C1 has a capacitance of 1000 pF and resistor R6 has a resistance of 100 k ohms, the time constant equals 100 microseconds.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A motor driver high current protector comprising:
   (a) a voltage source;
   (b) a current sensor configured to sense current passing through the motor driver and output a voltage responsive to the sensed current;
   (c) a comparator having an output and configured to generate a low voltage at the output of the comparator while the output of the current sensor exceeds a first reference voltage;
   (d) a switch having an input, an output, and a base activated by a low voltage at the output of the comparator to close the switch, providing electrical connection between the input and the output of the switch, the input of the switch connected to the voltage source; and,
   (e) an inhibitor configured to inhibit the motor driver while the output of the switch exceeds a second reference voltage.

2. The protector of claim 1 wherein the current sensor includes a resistor connected to the motor driver to sense the current passing through the motor driver and produce a voltage drop as the output of the current sensor.

3. The protector of claim 1 wherein the switch includes a transistor.

4. The protector of claim 3 wherein the switch includes first and second resistors for controlling the voltage at the base of the transistor, the first resistor provided between the output of the comparator and the base of the transistor, the second resistor provided between the voltage source and the base of the transistor.

5. The protector of claim 1 wherein the inhibitor includes first and second inhibitor comparators, each of the inhibitor comparators having an output, each of the first and second inhibitor comparators configured to generate a low voltage at the output of the inhibitor comparator while the output of the switch exceeds a second reference voltage.

6. The protector of claim 1 further including a delay circuit connected to the output of the switch and configured to decay the voltage at the output of the switch while the switch is open.

7. The protector of claim 6 wherein the delay circuit includes a resistor and a capacitor each connected to the output of the switch.

8. A method for protecting a motor driver from high current, the method comprising:
   (a) sensing current passing through the motor driver;
   (b) outputting a first voltage responsive to the sensed current;
   (c) generating a low second voltage while the first voltage exceeds a first reference voltage;
   (d) responsive to the low second voltage, closing a switch to provide connection between a voltage source and an output of the switch; and, (e) inhibiting the motor driver while the output of the switch exceeds a second reference voltage.

9. The method of claim 8 wherein sensing the current and outputting the first voltage includes passing the current from the motor driver through a resistor to generate a voltage.

10. The method of claim 8 wherein closing the switch includes activating a transistor by providing the low second voltage to a base of the transistor.

11. The method of claim 10 wherein closing the switch further includes controlling the voltage at the base of the transistor with first and second resistors, the first resistor provided between the output of a comparator and the base of the transistor, the second resistor provided between the voltage source and the base of the transistor.

12. The method of claim 8 wherein inhibiting the motor driver includes generating low second and third voltages while the output of the switch exceeds a second reference voltage.

13. The method of claim 8 further including decaying the voltage at the output of the switch while the switch is open.

14. The method of claim 13 wherein decaying the voltage includes providing a resistor and a capacitor connected to the output of the switch and discharging the capacitor with the resistor.

* * * * *